A. W. YOUNGKVIST.
SPRING WHEEL.
APPLICATION FILED NOV. 6, 1913.

1,111,204.

Patented Sept. 22, 1914.

WITNESSES
L. L. Burket
C. P. Wright Jr.

INVENTOR
A. W. Youngkvist,
BY
A. S. Pattison,
ATTORNEY

UNITED STATES PATENT OFFICE.

AMANDUS WALFRID YOUNGKVIST, OF DULUTH, MINNESOTA, ASSIGNOR TO EASY AUTO WHEEL COMPANY, OF DULUTH, MINNESOTA.

SPRING-WHEEL.

1,111,204.     Specification of Letters Patent.     Patented Sept. 22, 1914.

Application filed November 6, 1913. Serial No. 799,510.

*To all whom it may concern:*

Be it known that I, AMANDUS WALFRID YOUNGKVIST, a citizen of the United States, residing at Duluth, in the county of St. Louis and State of Minnesota, have invented certain new and useful Improvements in Spring-Wheels, of which the following is a specification, reference being had therein to the accompanying drawing.

My invention relates to improvements in spring wheels.

The object of my invention is to provide an arrangement, whereby the ordinary wheel now in use can be readily converted into a spring wheel at a small cost and at the same time have all of the qualifications of a specially constructed spring wheel.

Another object of my invention is to provide a simple, cheap and more effective spring wheel which is very durable in its construction and having certain details of structure hereinafter more fully set forth.

Figure 1:
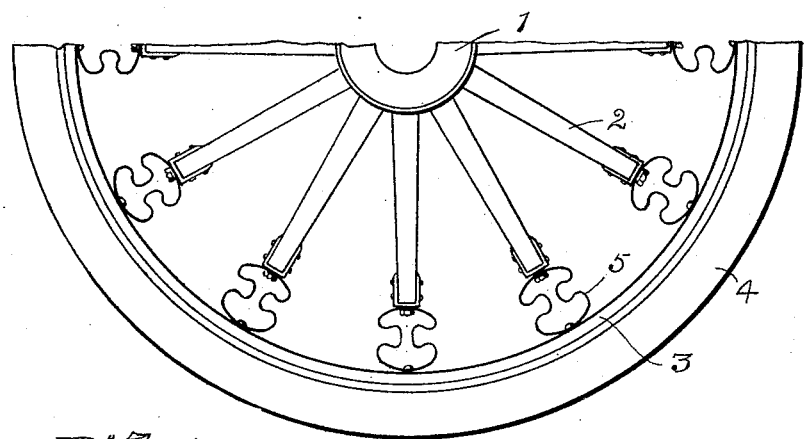
Figure 2:
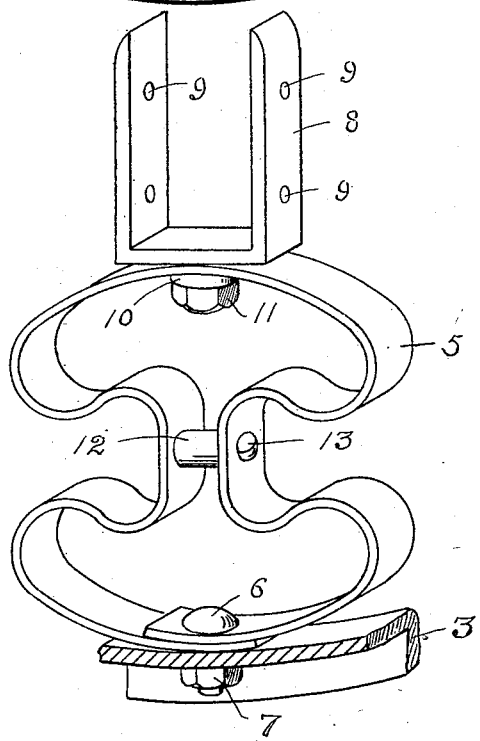

In the accompanying drawings—Figure 1 is a side view of a portion of an ordinary wheel, showing my invention applied thereto. Fig. 2 is a perspective view of my improved spring and its attaching means adapted to be attached to the ordinary wheel now in use.

Referring now to the drawings, 1 represents the hub of the ordinary wheel having the usual spokes 2, extending toward the rim 3, carrying the tire 4, all of which are of the usual construction and need no further description. In applying my device to a wheel of this character, it is only necessary to cut the spokes at the intersection thereof with the rim 3 and slightly shorten the same by sawing a piece therefrom, as is clearly shown in Fig. 1 of the drawings. The shortening of the spokes, as will be readily seen, leaves a space between the end of the spokes and the rim 3 of the wheel. Between the rim 3 and the ends of the spokes are placed curvilinear band springs 5, the ends of which are adapted to overlap and are secured to the rim or felly 3, by any suitable or convenient means, such as bolts 6 or a plurality of bolts, as may be desired. These bolts are of such a length that they will pass through holes at the ends of the springs 5, and through the rim or felly 3, and are provided with nuts 7 for locking the ends of the springs to the rim or felly. While I have shown this manner of attaching the ends of the springs 5 to the rim or felly, it will be understood that this can be varied without departing from my invention.

The ends of the spokes 2 are provided with U-shaped sockets 8, which are preferably made of cast-metal and provided with openings 9, through which screws or bolts pass for attaching the sockets to the ends of the spokes 2. As heretofore stated, the sockets 8 are preferably made of cast-metal and are provided with lugs or bolts 6, formed integral with the lower or outer face thereof and are adapted to pass through openings in the inner end of the springs 5, as clearly shown in Fig. 2 of the drawings. Placed upon the threaded lug or bolt 6, on the outside of the springs 5 is a washer 10, and screwed upon the threaded lugs or bolts are nuts 11, which firmly clamp the washers 10 against the spring and securely lock the springs 5 to the outer face of the sockets 8 to prevent them from oscillating or rotating on the socket. It is understood that a similar means of attaching ends of the springs 5 to the rim or felly 3 could be employed.

As heretofore stated, the springs 1 are composed of curvilinear spring bands and, as shown, are of a symmetrical form and each spring comprises two outwardly facing partly elliptical shaped portions disposed at substantially right angles to two inwardly facing partly elliptical-shaped portions, all comprised of the band and so arranged that in the event of abnormal pressure coming upon the spring, the adjacent abutting portions of the spring may impinge against each other and thus prevent the same from being broken. By this structure I am enabled to get the maximum resiliency within a given space.

If preferred, the two adjacent inwardly facing partly elliptical-shaped portions may be rigidly fixed to each other by means of a fillet 12 and bolt 13, the latter passing through the spring and fillet, as clearly shown, or other suitable means may be resorted to for uniting such parts. This latter connection however, would only be necessary in the event of power being applied to the axle of such a wheel, as for instance, the rear wheels of an automobile where greater rotary resistance is required.

Having thus described my invention, what I claim and desire to secure by Letters Patent is:

A spring wheel comprising a hub and spokes, a felly spaced from the ends of the spokes and springs between the ends of the spokes and the felly, the said springs composed of curvilinear spring metal having the center of their sides drawn inwardly and connected forming two equal coöperating resilient portions carried by the spokes and the felly respectively.

In testimony whereof I hereunto affix my signature in the presence of two witnesses.

AMANDUS WALFRID YOUNGKVIST.

Witnesses:
H. T. LUNDGHEN,
F. Y. ANDERSON.

Copies of this patent may be obtained for five cents each, by addressing the "Commissioner of Patents, Washington, D. C."